United States Patent [19]

Laitar et al.

[11] Patent Number: 4,546,124

[45] Date of Patent: Oct. 8, 1985

[54] POLYURETHANE BINDER COMPOSITIONS

[75] Inventors: Robert A. Laitar, Woodridge; Eduardo Gomez, Chicago, both of Ill.

[73] Assignee: Acme Resin Corporation, Forest Park, Ill.

[21] Appl. No.: 660,170

[22] Filed: Oct. 12, 1984

[51] Int. Cl.$^4$ ............................................. C08G 18/06
[52] U.S. Cl. ..................................... 523/143; 525/504
[58] Field of Search ......................... 523/143; 525/504

[56] References Cited

U.S. PATENT DOCUMENTS

| | | |
|---|---|---|
| 2,079,633 | 5/1937 | Rothrock . |
| 3,409,579 | 11/1968 | Robins . |
| 3,676,392 | 7/1972 | Robins . |
| 3,726,867 | 4/1973 | Robins ................................ 523/143 |
| 3,894,981 | 7/1975 | Kruglikov et al. . |
| 4,079,031 | 3/1978 | Sardessai ............................ 525/504 |
| 4,116,916 | 9/1978 | Holik . |
| 4,317,896 | 3/1982 | Holik .................................. 524/541 |
| 4,358,570 | 11/1982 | Tobinaga ............................ 525/504 |
| 4,436,881 | 3/1984 | Laitar ................................. 525/504 |

*Primary Examiner*—C. Warren Ivy
*Attorney, Agent, or Firm*—Stanley M. Parmerter

[57] ABSTRACT

A foundry binder composition which provides foundry cores and molds of superior hot strength comprises a polyisocyanate, a polyhydroxy component and a catalyst. The polyhydroxy component is an alkoxy modified phenolic resole resin containing at least one alkoxy methylene group for every six phenolic nuclei in the resin.

27 Claims, No Drawings

POLYURETHANE BINDER COMPOSITIONS

FIELD OF THE INVENTION

This invention relates to binder compositions, moldable compositions which include the binders and aggregate material, cores or molds made from the moldable compositions, and a process for making them. More particularly, the invention relates to foundry binder compositions, moldable compositions including the same, and aggregate material in foundry cores or molds made therefrom, including a process for their manufacture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder or binder system. Typically, after the aggregate material and binder have been mixed, the resultant mixture is rammed, blown, or otherwise formed to the desired shape or patterns, and then cured with the use of catalyst and/or heat to a solid, cured state.

Resin binders used in the production of foundry molds and cores are often cured at high temperatures to achieve the fast-curing cycles required in foundries. However, in recent years, resin binders have been developed which cure at a low temperature, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst at ambient temperatures through the molded resin-coated material. In such processes, the binder components normally comprise a polyhydroxy component and a polyisocyanate component. These cure to form a polyurethane in the presence of a gaseous amine catalyst.

Another group of binder systems which do not require gassing or heating in order to bring about curing are known as "no-bake" systems. These "no-bake" systems also frequently employ an aggregate material, such as sand coated with a polyhydroxy component and a polyisocyanate component. In this case, the coated sand is usually mixed with a liquid tertiary amine catalyst just before the sand is placed into a holding pattern or core box, and the material is allowed to cure at ambient temperatures or slightly higher.

Although developments in resinous binder systems which can be processed according to the "cold-box" or "no-bake" processes have resulted in the provision of useful systems, such systems with urethane binders still exhibit certain disadvantages. For example, cores and molds made with these binders have relatively low hot strength. Low hot strength results in foundry cores and molds that are prone to casting defects such as scabs, erosion, and burn-in. These defects have limited the use of systems employing urethane binders in certain iron and steel casting applications. A reduction in these casting defects would be of great value to foundries.

Now it has been found, in accordance with this invention, that the use of certain modified polyhydroxy components in the "no-bake" and "cold-box" processes overcomes this deficiency and provides cores and molds with greater hot strength.

SUMMARY OF THE INVENTION

In accordance with this invention, there is provided a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified phenolic resole resin containing at least one alkoxy methylene group for every six phenolic nuclei wherein the preponderance of the bridges joining the phenolic nuclei of said resin are ortho-ortho benzylic ether bridges.

Additionally, in accordance with the invention, there is provided a moldable composition comprising aggregate material, such as foundry sand, and a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified phenolic resole resin containing at least one alkoxy methylene group for every six phenolic nuclei wherein the preponderance of the bridges joining the phenolic nuclei of said resin are ortho-ortho benzylic ether bridges.

Finally, in accordance with the invention, there is provided a process for making foundry cores or molds which comprises admixing aggregate material, such as a foundry sand or the like, and a binding amount of a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified phenolic resole resin containing at least one alkoxy methylene group for every six phenolic nuclei wherein the preponderance of the bridges joining the phenolic nuclei of said resin are ortho-ortho benzylic ether bridges.

DETAILED DESCRIPTION OF THE INVENTION

The polyhydroxy component used in the practice of this invention is an alkoxy modified phenolic resole resin. This resin may be produced by heating a mixture of an aldehyde, a phenol, and a lower monohydric aliphatic alcohol in the presence of a divalent metal ion catalyst.

Alternatively, the alkoxy modified resole resin may be prepared by a two-step process. An unmodified phenolic resole resin is prepared by heating the aldehyde and phenol in the presence of the catalyst. This resin is then modified by heating with a lower monohydric aliphatic alcohol at a pH below about 6.5 followed by dehydration to remove water produced in the reaction with the alcohol.

The preferred method for producing the alkoxy modified phenolic resole resins used in the practice of the present invention involves reacting the phenol, the aliphatic alcohol, and aqueous formaldehyde at an elevated temperature in the presence of a divalent metal ion catalyst. Excess water is removed by evaporation under reduced pressure. If desired, the dehydrated product can be held at an elevated temperature under vacuum to increase the viscosity of the product. The resulting resin is diluted with sufficient solvent to obtain a product with the desired viscosity.

Phenols suitable for preparing the alkoxy modified phenolic resole resins of this invention are generally any of the phenols which may be utilized in the formation of phenolic resins, and include substituted phenols, as well as unsubstituted phenol per se. The nature of the substituent can vary widely, and exemplary substituted phenols include alkyl-substituted phenols, aryl-substituted phenols, cycloalkyl-substituted phenols, alkenyl-substituted phenols, alkoxy-substituted phenols, aryloxy-substituted phenols, and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the alkoxy modified phenolic resole resin employed in this invention can also vary widely. Suitable aldehydes include any of the aldehydes heretofore employed in the formation of phenolic resins, such as formaldehyde, acetaldehyde, propionaldehyde, and benzaldehyde. In general, the aldehydes employed contain from 1 to 8 carbon atoms. The most preferred aldehyde is formaldehyde which may be used either as its aqueous solution or in its nonaqueous form as one of its solid polymers, such as paraformaldehyde.

Alcohols useful for preparing the alkoxy modified liquid phenolic resole resins of this invention are generally primary and secondary monohydric aliphatic alcohols containing from 1 to 8 carbon atoms. Examples of useful alcohols are methanol, ethanol, n-propanol, isoproponal, n-butanol, and hexanol. Methanol is a preferred alcohol.

Metal ion catalysts useful in production of the alkoxy modified phenolic resole resins of the present invention include salts of the divalent ions of Mn, Zn, Cd, Mg, Co, Ni, Fe, Pb, Ca, and Ba. Tetraalkoxy titanium compounds of the formula Ti(OR)$_4$, where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-ortho benzylic ether bridges of the general formula —CH2(OCH2)$_n$— where n is a small positive integer.

A molar excess of aldehyde per mole of phenol is used to make the resole resins of this invention. It is preferable that the molar ratio of aldehyde to phenol be in the range of from about 1.2:1 to about 2.2:1.

In the preparation of the alkoxy modified phenolic resole resins of the present invention, sufficient alcohol is used to ensure that the alkoxy modified liquid phenolic resole resin will have at least one alkoxy methylene group for every 6 phenolic nuclei present in the resin. The alkoxy methylene groups have the general formula —(CH2O)$_n$R where R is the alkyl group of the alcohol used, and n is a small positive integer. These groups are substituents at the positions ortho and para to the phenolic hydroxyl groups in the resin.

Use of at least about 0.25 mole of alcohol per mole of phenol will generally provide the desired degree of substitution. When the molar ratio of alcohol to phenol in the reaction mixture is 1:1 or higher, the resulting products are satisfactory for use in the process of this invention, but the presence of larger amounts of alcohol tend to slow down the reaction between the phenol and the aldehyde and leave considerable amounts of unreacted alcohol to be evaporated at the end of the reaction.

The isocyanate component which can be employed in a binder according to this invention, may likewise vary widely and has a functionality of 2 or more. Exemplary of the useful isocyanates are organic polyisocyanates such as tolylene-2,4-diisocyanate, tolylene-2,6-diisocyanate, and mixtures thereof, and particularly the crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4''-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general formula:

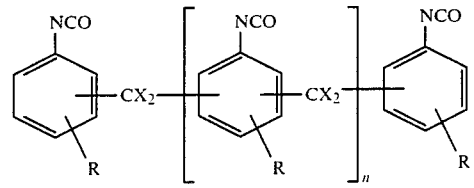

wherein R is selected from the group consisting of hydrogen, chlorine, bromine, alkyl groups having 1 to 5 carbon atoms, and alkoxy groups having 1 to 5 carbon atoms; X is selected from the group consisting of hydrogen, alkyl groups having 1 to 10 carbon atoms and phenyl; and n has an average value of at least about 1 and generally about 1 to about 3. A typical commercially available isocyanate is polymethylene polyphenylisocyanate such as PAPI-135 sold by Upjohn Company and having a Brookfield viscosity of about 200 centipoises at 25° C., and an isocyanate equivalent of 134.

Generally, the amounts of the polyhydroxy component and the isocyanate component employed in a binder composition of the invention are not critical and can vary widely. However, there should at least be enough of the isocyanate component present to give adequate curing of the binder.

The isocyanate component is generally employed in a range of from about 15% to about 400% by weight, based on the weight of the polyhydroxy component, and is preferably employed in a range of from about 20 to about 200%. Moreover, while a liquid isocyanate can be used in undiluted form, so long as there is sufficient solvent employed with the polyhydroxy component, solid or viscous isocyanates can also be utilized and are generally used with an organic solvent. In this respect, the isocyanate component may include up to 80% by weight of solvent.

Furthermore, it is to be understood that in accordance with the invention, both the polyhydroxy and isocyanate components are, as a practical matter, preferably dissolved in solvents in order to provide component solvent mixtures of desirable viscosity and thus facilitate the use of the same, such as in coating aggregate material with the components. In this respect, sufficient solvents are employed to provide a Brookfield viscosity of solutions of the components which is below about 1000 centipoises and preferably less than about 300 centipoises. More specifically while the total amount of solvent can vary widely, it is generally present in a composition of this invention in a range of from about 5% to about 70% by weight, based on total weight of the polyhydroxy component, and is preferably present in a range of from about 20% to about 60% by weight.

The solvents employed in the practice of this invention are generally mixtures of hydrocarbon and polar organic solvents such as organic esters.

Suitable exemplary hydrocarbon solvents include aromatic hydrocarbons such as benzene, toluene, xylene, ethyl benzene, high boiling aromatic hydrocarbon mixtures, heavy aromatic naphthas and the like. It is preferred to use hydrocarbon solvents with a flash point above 100° F.

As previously indicated hereinabove, the compositions of this invention can be cured by both the "cold-box" and "no-bake" processes. The compositions are cured by means of a suitable catalyst. While any suitable catalyst for catalyzing the reaction between the phenolic resin component and isocyanate component may be used, it is to be understood that when employing the "cold-box" process the catalyst employed is generally a volatile catalyst. On the other hand, where the "no-bake" process is employed, a liquid catalyst is generally utilized. Moreover, no matter which process is utilized, that is, the "cold-box" or the "no-bake" process, at least enough catalyst is employed to cause substantially complete reaction of the polyhydroxy and isocyanate components.

Preferred exemplary catalysts employed when curing the compositions of this invention by the "cold-box" process are volatile tertiary amine gases which are passed through a core or mold generally along with an inert carrier, such as air or carbon dioxide. Exemplary volatile tertiary amine catalysts which result in a rapid cure at ambient temperature that may be employed in the practice of the present invention include trimethylamine, triethylamine and dimethylethylamine and the like.

On the other hand, when utilizing the compositions of this invention in the "no-bake" process, liquid tertiary amine catalysts are generally and preferably employed. Exemplary liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher this number is, the weaker the base. Bases falling within the mentioned range are generally organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl-pyridines wherein the alkyl group has from 1 to 4 carbon atoms, isoquinoline, arylpyridines, such as phenylpyridine, pyridine, acridine, 2-methoxypyridine, pyridazines, 3-chloropyridine, quinoline, N-methylimidazole, 4,4-dipyridine, phenylpropylpyridine, 1-methylbenzimidazole and 1,4-thiazine. Additional exemplary, suitable preferred catalysts include but are not limited to tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalysts. Examples of useful metal organic compounds which may be employed as added catalytic materials are cobalt naphthenate, cobalt octoate, dibutyltin dilaurate, stannous octoate and lead naphthenate and the like. When used in combinations, such catalytic materials, that is the metal organic compounds and the amine catalysts, may be employed in all proportions with each other.

It is further understood that when utilizing the compositions of this invention in the "no-bake" process, the amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

When employing a binder composition of this invention in the "no-bake" process, the curing time can be controlled by varying the amount of catalyst added. In general, as the amount of catalyst is increased, the cure time decreases. Furthermore, curing takes place at ambient temperature without the need for subjecting the compositions to heat, or gassing or the like. In this regard, however, in usual foundry practice preheating of the sand is often employed to raise the temperature of the sand to from about 30° F. up to as high as 120° F., and preferably up to about 75° F. to 100° F. in order to accelerate the reactions and control temperature and thus provide a substantially uniform operating temperature on a day-to-day basis. However, it is to be understood that such preheating is neither critical nor necessary in carrying out the practice of this invention.

While the binder compositions of this invention may be employed by admixing the same with a wide variety of particulate materials, such as limestone, calcium silicate and gravel and the like, in order to bind the same, and the admixture then manipulated in suitable fashion to form coherent shaped structures, they are particularly useful in the foundry art as binding compositions for foundry sand. When so employed, the amount of binder and sand can vary widely and is not critical. On the other hand, at least a binding amount of the binding composition should be present in order to coat substantially completely and uniformly all of the sand particles and to provide a uniform admixture of the sand and binder and, so that when the admixture is conveniently shaped as desired and cured, there is provided a strong, uniform, shaped article which is substantially uniformly cured throughout, thus minimizing breakage and warpage during handling of the shaped article, such as, for example, sand molds or cores, so made. In this regard, the binder may be present in a moldable composition, in accordance with this invention, in a range of from about 0.7% to about 6.0% by weight based on the total weight of the composition.

In the practice of this invention, additives normally utilized in foundry manufacturing processes can also be added to the compositions during the sand coating procedure. Such additives include materials such as iron oxide, clay, carbohydrates, potassium fluoroborates, wood flour and the like.

Other commonly employed additives can be optionally used in the binder compositions of this invention. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes such as, for example, γ-aminopropyltrimethoxysilane, γ-hydroxypropyltrimethoxysilane, 3-ureidopropyltriethoxysilane, γ-mercaptopropyltrimethoxysilane, γ-glycidoxypropyltrimethoxysilane, β-(3,4-epoxycyclohexyl)trimethoxysilane, N-β-(amino-ethyl)γ-aminopropyltrimethoxysilane and the like.

In general, the process for making a moldable composition, in accordance with this invention, comprises admixing aggregate material with at least a binding amount of the alkoxy modified phenolic resole resin component. The resin is dissolved in sufficient solvent to reduce the viscosity of the phenolic resinous component to below about 1000 centipoises. This solvent comprises hydrocarbon solvents, polar organic solvents and mixtures thereof. Then an isocyanate component, having a functionality of two or more, is added and mixing is continued to uniformly coat the aggregate material with the phenolic resin and isocyanate components. The admixture is suitably manipulated, as for example, by distributing the same in a suitable core box or pattern. A sufficient amount of catalyst is added to substantially completely catalyze the reaction between the components. The admixture is cured forming a shaped product.

It is to be understood that there is no criticality in the order of mixing the constituents with the aggregate material. On the other hand, the catalyst should generally be added to the mixture as the last constituent of the composition so that premature reaction between the components does not take place. It is to be further understood that as a practical matter, the phenolic resin component can be stored separately and mixed with solvent just prior to use or, if desirable, mixed with solvent and stored until ready to use. Such is also true with the isocyanate component. On the other hand, as a practical matter, the phenolic and isocyanate components should not be brought into contact with each other until ready to use in order to prevent any possible premature reaction between them. The components may be mixed with the aggregate material either simultaneously or one after the other in suitable mixing devices, such as mullers, continuous mixers, ribbon blenders and the like, while continuously stirring the admixture to insure uniform coating of aggregate particles.

More specifically, however, when the admixture is to be cured according to "cold-box" procedures, the admixture after shaping as desired, is subjected to gassing with vapors of an amine catalyst. Sufficient catalyst is passed through the shaped admixture to provide substantially complete reaction between the components. The flow rate is dependent, of course, on the size of the shaped admixture as well as the amount of phenolic resin therein.

In contrast, however, when the admixture is to be cured according to "no-bake" procedures, the catalyst is generally added to the aggregate material simultaneously while coating the aggregate material with the phenolic and isocyanate components. The admixture is then shaped and simply permitted to cure until reaction between the components is substantially complete, thus forming a shaped product such as a foundry core or mold. On the other hand, it is to be understood that the catalyst may also be admixed with either one of the components prior to coating of the aggregate material with the components.

Consequently, by so proceeding, as indicated with an admixture of foundry sand and a binding amount of the phenolic and isocyanate components with a catalyst, there is formed a foundry core or mold comprising foundry sand and a binding amount of a binder composition comprising the reaction product of the phenolic and isocyanate components.

The following specific examples illustrate the present invention. They are not intended to limit the invention in any way. Unless otherwise indicated, all parts and percentages are by weight.

EXAMPLE 1

In a 12-liter flask equipped with a stirrer, reflux condenser and thermometer was placed 4.29 kg of phenol, 4.43 kg of 50% aqueous formaldehyde solution, 787 g of methanol, and 342 g of a 25% aqueous solution of zinc acetate. The reaction mixture, which had a pH of 5.2 was heated at 95° C. under reflux until the free formaldehyde content was 2.7%. The free formaldehyde was determined by the standard hydroxylaminehydrochloride method. The reaction mixture was cooled to 45° C. and the pH adjusted to 3.7 by the addition of 23 g of citric acid in an equal amount of water. Water was removed from the reaction mixture by heating under reduced pressure until the temperature reached 95° C. at 27 inches of vacuum. The mixture was held for 3.5 hours at this temperature under vacuum to give the methoxy modified phenolic resole resin. A solution of the resin was used as the polyhydroxy component in foundry urethane binders. This solution was prepared by dissolving 55 g of the resin in a mixture of 20 g of dibasic ester and 25 g of aromatic hydrocarbon solvent. 0.4 g of silane A-1160 was also added. Dibasic ester, available from Du Pont, Wilmington, Del., contains approximately 25% dimethyl succinate, 50% dimethyl glutarate, and 25% dimethyl adipate. The hydrocarbon solvent is an aromatic hydrocarbon having a flash point above 100° F. The silane is sold by the Union Carbide Corp., New York, N.Y. The isocyanate solution used for the preparation of the urethane resin was prepared by dissolving 75% polymethylene polyphenylisocyanate, in 25% of the aromatic hydrocarbon solvent.

To a K-45 Kitchen Aid mixer was added 2500 g of silica sand. The mixer was started and 17.2 g of the methoxy modified resole resin solution and 14.1 g of the polymeric isocyanate were added. Then 0.7 ml of a tertiary amine catalyst solution was added. (The catalyst is a commercial catalyst, No. 5082, available from the Acme Resin Corp., Forest Park, Ill.) The sand was discharged from the mixer 1 minute after the addition of the catalyst. Part of the sand was used immediately to form 12 standard American Foundry Society 1-inch dog bone tensile briquets using a Dietert No. 696, 12-gang core box. Cores were cured at room temperature and broken after 10-minute, 1-hour, and 24-hour cure times. Tensile strengths were determined using a Detroit Testing Machine Company Model CST tester. A second portion of the sand was used to make a pyramid core. A thermometer was inserted into the core. The stripping time was determined as the time at which the core is so hard that the thermometer can no longer be pushed into the core. All samples from this and the following examples showed stripping times of 5-6 minutes. An additional amount of the coated sand was used to prepare cured 1⅛-inch diameter×2-inch cylindrical cores. The relative collapsibility of the cores was determined by placing the core specimens in a Dietert No. 785 Thermolab Dilatometer. Collapsibility of the cores at 1010° C. under 50 psi pressure was measured. The time required for the core to collapse under pressure and heat was determined. The longer the time to collapse, the higher the thermal strength of the core. A final portion of the coated sand was used to prepare cores for use in the AFS hot distortion test. In this test, a piece of bonded sand, 1×5/16×4½ inches, is loaded as a cantilever and strongly heated in the center of one face while a deflection sensor rests on the free end of the strip. The length of time until the test piece collapses is the hot distortion time.

A comparative test resin was prepared following the same directions as used for the resin of Example 1, except that no methanol was added to the reaction mixture. The resulting resin was somewhat more viscous than the resin of Example 1. In order to prepare a resin solution suitable for testing, 55 g of this resin was dissolved in 45 g of the dibasic ester solvent and no hydrocarbon solvent was employed.

A second comparative test resin was Acme Bond No. 5033, a commercial phenolic resin available from the Acme Resin Corp., Forest Park, Ill. The results of the tests performed on the resin of this example and the two comparative test resins are given in Table I. The excellent hot strength of the cores prepared from the methoxy modified phenolic resole resin of the present invention is clearly shown by their superior hot distortion and dilatometer collapsibility times, when compared with those of the comparative test cores prepared from unmodified phenolic resins.

TABLE I

| Resin Used in Test Cores | Tensile Strength, psi (Scratch Hardness) | | | Hot Distortion Time (sec) | Dilatometer Collapsibility Time (sec) |
|---|---|---|---|---|---|
| | 10 min | 1 hr | 24 hrs | | |
| Example 1 (With Methoxyl Groups) | 92 (71) | 225 (84) | 300 (83) | 231 | >331 |
| Comparative Test Resin (No Methoxyl Groups) | 15 (61) | 63 (77) | 132 (79) | 72 | — |
| Commercial Resin (Comparative Test) | 110 (71) | 213 (78) | 305 (85) | 63 | 90 |

EXAMPLE 2

This example illustrates use of the alkoxy modified phenolic resole resin in the "cold-box" process. The resin solution was prepared as in Example 1 except that the resin solution contained 1% of red oil as a release agent. The resole resin solution (21.5 g) and 17.6 g of the isocyanate solution were mixed with 3 kg of 410 sand using a K-45 Kitchen Aid mixer. The foundry mix was blown into a Redford CBT-1 core blower. Cores were blown at 50 psi air pressure and gassed 3 seconds with a 12% dimethylethylamine in $CO_2$ at 30 psi and then for 5 seconds with purge air at 30 psi. Tensile strengths were measured 1 minute, 1 hour, and 24 hours after curing using a Detroit Testing Machine Company Model CST tensile tester. Hot distortion times and dilatometer collapsibility times were also measured using the general tests described in Example 1 for cores that have been held overnight before testing.

Comparative tests were run on cores prepared using a commercial phenolic resin solution, Acme Flow No. 2030. The results given in Table II show that the cores prepared from the alkoxy modified phenolic resole resin in the "cold-box" process have superior hot strengths to those prepared from a commercial phenolic resole resin in the same process.

TABLE II

| Resin Used in Test Cores | Tensile Strength, psi (Scratch Hardness) | | | Hot Distortion Time (sec) | Dilatometer Collapsibility Time (sec) |
|---|---|---|---|---|---|
| | 1 min | 1 hr | 24 hrs | | |
| Methoxy Modified Resole Resin | 122 (64) | 190 (71) | 210 (71) | 68 | 140 |
| Comparative Test Commercial Resin (Without Methoxyl Groups) | 137 (63) | 155 (69) | 168 (70) | 61 | 92 |

EXAMPLE 3

This example illustrates the use of a substituted phenol rather than phenol per se in the formation of the alkoxy modified phenolic resole resin and its use in a "no-bake" process. The general procedure of Example 1 was repeated using 1317 g of p-cresol, 1185 g of 50% aqueous formaldehyde solution, 212 g of methanol, and 158 g of a 25% aqueous solution of zinc acetate. The reactants were heated at 95° C. until the free formaldehyde was 3.9%. The resin was cooled by dehydration under vacuum to 45° C. and a solution of 10.5 g of citric acid in 10.5 g of water was added to give a pH of 4.2. The resin was dehydrated under vacuum to a temperature of 95° C. and 27 inches of vacuum and held under these conditions for 1 hour. A comparative test resin was prepared using the same procedure except that the methanol was omitted.

Both the resin of this example and the comparative test resin were dissolved in a mixture of solvents as was the resin in Example 1, and the resin solution was treated with the isocyanate solution and tertiary amine catalyst under the conditions given in that example. The results of the tests on the cores prepared under these conditions are given in Table III. They, again, show the superior hot strength of the alkoxy modified resole resin when the resin is prepared from a substituted phenol.

TABLE III

| Resin Used in Test Cores | Tensile Strength, psi (Scratch Hardness) | | | Hot Distortion Time (sec) | Dilatometer Collapsibility Time (sec) |
|---|---|---|---|---|---|
| | 10 min | 1 hr | 24 hrs | | |
| Methoxy Modified | 113 | 213 | 315 | 65 | 117 |

TABLE III-continued

| Resin Used in Test Cores | Tensile Strength, psi (Scratch Hardness) | | | Hot Distortion Time (sec) | Dilatometer Collapsibility Time (sec) |
| --- | --- | --- | --- | --- | --- |
| | 10 min | 1 hr | 24 hrs | | |
| p-Cresol Resole Resin | (80) | (81) | (86) | | |
| Comparative Test p-Cresol Resole (Without Methoxyl Groups) | 138 (83) | 230 (84) | 325 (84) | 61 | 84 |

EXAMPLE 4

This example illustrates that the alkoxy modified phenolic resole resin can be prepared in two steps. The unmodified resin is first prepared and then reacted with the alcohol.

A solution of 1.88 kg of phenol, 1.5 kg of 50% aqueous formaldehyde solution and 150 g of 25% aqueous zinc acetate solution was heated at 95° C. until the residual free formaldehyde was 3%. The mixture was cooled to 45° C. before the pH was adjusted to 4.3 by the addition of a solution of 10 g of citric acid and 10 g of water. The resin was dehydrated by heating to a temperature of 90° C. under 27 inches of vacuum. The flask containing the residual resin was fitted with a reflux condenser and 267 g of methanol was added slowly. Then the mixture was refluxed for 2 hours at 95° C. before vacuum was applied and the resin was then held for 3 hours at 95° C. and 27 inches of vacuum.

A resin was prepared using the same proportions of phenol, formaldehyde and methanol except that all of the material was mixed together with the zinc acetate catalyst as in Example 1, (one-step process).

A comparative test resin was also prepared using the same proportions of reactants except that the methanol was omitted. The comparative test resin and the two methoxy modified resins of this example were dissolved in solvents as in Example 1 and the resin solution was treated with the isocyanate solution and tertiary amine catalyst under the conditions given in that example. The results of the test on the cores prepared under these conditions are reported in Table IV. They show that the alkoxy modified resole resin prepared by the two-step process gives cores of superior hot strength to those prepared without the alkoxy modification, but they show somewhat less strength than those prepared in the one-step process using the same proportions of reactants.

TABLE IV

| Resin Used in Test Cores | Hot Distortion Time (sec) | Dilatometer Collapsibility Time (sec) |
| --- | --- | --- |
| Methoxy Modified Resole Resin (Two-Step Process) | 80 | 159 |
| Methoxy Modified Resole Resin (One-Step Process) | 85 | 240 |
| Comparative Test (Resin Without Methoxyl Groups) | 73 | 92 |

EXAMPLE 5

Several runs were made to determine the effect of varying the mole ratio of alcohol to phenol in preparation of the alkoxy modified phenolic resole resins. In each case, the general procedure for making the phenolic resins and for making the test cores using binders containing these resins were the same as those followed in Example 1. In one of the runs, methanol was replaced with ethanol to give an ethoxy modified resole resin. The results of the tests on the test cores made from these resins and that of a comparative test core made from an unmodified phenolic resin containing no alkoxy group are given in Table V. The test results indicate that both methoxy and ethoxy modified phenolic resole resins give cores of improved hot strength when used in the "no-bake" process. The optimum hot strength was obtained when the mole ratio of methanol to phenol was about 0.5:1. Although some improvement was shown when the mole ratio of alcohol to phenol was about half this value.

TABLE V

| Resin Used in Test Cores | Molar Ratio Phenol: Formaldehyde: Alcohol | Hot Distortion Time (sec) | Dilatometer Collapsibility Time (sec) |
| --- | --- | --- | --- |
| Methoxy Modified | 1:1.62:0.27 | 86 | 139 |
| | 1:1.62:0.54 | 103 | 404 |
| | 1:1.62:0.81 | 90 | 382 |
| | 1:1.62:1.62 | 89 | 229 |
| Ethoxy Modified | 1:1.62:0.54 | 92 | 298 |
| Comparative Test (No Alkoxyl Groups) | 1:1.62:0 | 73 | 91 |

Thus, it is apparent that there has been provided, in accordance with the invention, a foundry binder composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. In a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified phenolic resole resin containing at least one alkoxy methylene group for every six phenolic nuclei wherein the preponderance of the bridges joining the phenolic nuclei of said resin are ortho-ortho benzylic ether bridges.

2. The binder composition of claim 1 wherein the alkoxy modified phenolic resole resin is prepared by reacting a phenol with a molar excess of an aldehyde and at least about 0.25 mole of a monohydric aliphatic alcohol per mole of phenol in the presence of a divalent metal ion catalyst.

3. The binder composition of claim 1 wherein the alkoxy modified phenolic resole resin is prepared by the steps of (a) reacting a phenol with a molar excess of an aldehyde in the presence of a divalent metal ion catalyst, (b) reacting the product of Step (a) with at least 0.25 mole of a monohydric aliphatic alcohol per mole of phenol used in Step (a), and (c) dehydrating to remove water produced in the reaction with the alcohol.

4. The binder composition of claim 2 wherein the monohydric aliphatic alcohol is methanol.

5. The binder composition of claim 2 wherein the monohydric aliphatic alcohol is ethanol.

6. The binder composition of claim 2 wherein the alkoxy modified phenolic resole resin is prepared by the reaction of phenol with from about 0.4 to about 0.9 molar equivalents of an alcohol.

7. The binder composition of claim 2 wherein the alkoxy modified phenolic resole resin is prepared from unsubstituted phenol and formaldehyde.

8. The binder composition of claim 1 wherein the isocyanate component is polymethylene polyphenylisocyanate.

9. In a moldable composition comprising aggregate material, such as foundry sand, and a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified pheolic resole resin containing at least one alkoxy methylene group for every six phenolic nuclei wherein the preponderance of bridges joining the phenolic nuclei of said resin are ortho-ortho benzylic ether bridges.

10. The moldable composition of claim 9 wherein the alkoxy modified phenolic resole resin is prepared by reacting a phenol with a molar excess of an aldehyde and at least about 0.25 mole of a monohydric aliphatic alcohol per mole of phenol in the presence of a divalent metal ion catalyst.

11. The moldable composition of claim 9 wherein the alkoxy modified phenolic resole resin is prepared by the steps of (a) reacting a phenol with a molar excess of an aldehyde in the presence of a divalent metal ion catalyst, (b) reacting the product of Step (a) with at least about 0.25 mole of a monohydric aliphatic alcohol per mole of phenol used in Step (a), and (c) dehydrating to remove water produced in the reaction with the alcohol.

12. The moldable composition of claim 10 wherein the monohydric aliphatic alcohol is methnol.

13. The moldable composition of claim 10 wherein the monohydric aliphatic alcohol is ethanol.

14. The moldable composition of claim 10 wherein the alkoxy modified phenolic resole resin is prepared by the reaction of phenol with from about 0.4 to about 0.9 molar equivalents of an alcohol.

15. The moldable composition of claim 10 wherein the alkoxy modified phenolic resole resin is prepared from unsubstituted phenol and formaldehyde.

16. The moldable composition of claim 9 wherein the isocyanate component is polymethylene polyphenylisocyanate.

17. In a process for making foundry cores or molds which comprises admixing aggregate material, such as foundry sand or the like, and a binding amount of a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of an alkoxy modified phenolic resole resin containing at least one alkoxy methylene group for every six phenolic nuclei wherein the preponderance of bridges joining the phenolic nuclei of said resin are ortho-ortho benzylic ether bridges.

18. The process of claim 17 wherein the alkoxy modified phenolic resole resin is prepared by reacting a phenol with a molar excess of an aldehyde and at least about 0.25 mole of a monohydric aliphatic alcohol per mole of phenol in the presence of a divalent metal ion catalyst.

19. The process of claim 17 wherein the alkoxy modified phenolic resole resin is prepared by the steps of (a) reacting a phenol with a molar excess of an aldehyde in the presence of a divalent metal ion catalyst, (b) reacting the product of Step (a) with at least about 0.25 mole of a monohydric aliphatic alcohol per mole of phenol used in Step (a), and (c) dehydrating to remove water produced in the reaction with alcohol.

20. The process of claim 18 wherein the monohydric aliphatic alcohol used is methanol.

21. The process of claim 18 wherein the monohydric aliphatic alcohol used is ethanol.

22. The process of claim 18 wherein the alkoxy modified phenolic resole resin is prepared by the reaction of phenol with from about 0.4 to about 0.9 molar equivalents of an alcohol.

23. The process of claim 18 wherein the alkoxy modified phenolic resole resin is prepared from unsubstituted phenol and formaldehyde.

24. The process of claim 17 wherein the isocyanate component is polymethylene polyphenylisocyanate.

25. The process of claim 17 wherein the catalyst is a tertiary amine catalyst.

26. The process of claim 17 which is employed in a "cold-box" system.

27. The process of claim 17 which is employed in a "no-bake" system.

* * * * *

UNITED STATES PATENT AND TRADEMARK OFFICE
CERTIFICATE OF CORRECTION

PATENT NO. : 4,546,124
DATED : October 8, 1985
INVENTOR(S) : Robert A. Laitar and Eduardo Gomez It is certified that error appears in the above-identified patent and that said Letters Patent are hereby corrected as shown below:

Column 3, line 15, "aryi" should read --aryl--.
Column 3, line 49, "saits" should read --salts--.
Column 6, line 30, "empioyed" should read --employed--.
Column 6, line 58, "criticai" should read --critical--.
Column 13, claim 9, line 26, "pheolic" should read --phenolic--
Column 13, claim 12, line 48, "methnol" should read --methanol--

Signed and Sealed this

Eleventh Day of March 1986

[SEAL]

Attest:

DONALD J. QUIGG

Attesting Officer

Commissioner of Patents and Trademarks